US012774638B2

(12) United States Patent
Silva et al.

(10) Patent No.: US 12,774,638 B2
(45) Date of Patent: Oct. 27, 2026

(54) RETROFIT VORTEX-INDUCED VIBRATION (VIV) SUPPRESSION DEVICE

(71) Applicant: Oceaneering International, Inc., Houston, TX (US)

(72) Inventors: Simao Silva, Houston, TX (US); Nikunj Patel, Katy, TX (US); Matthew Smith, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 18/770,864

(22) Filed: Jul. 12, 2024

(65) Prior Publication Data

US 2025/0020028 A1 Jan. 16, 2025

Related U.S. Application Data

(60) Provisional application No. 63/526,595, filed on Jul. 13, 2023.

(51) Int. Cl.

| | |
|---|---|
| ***E21B 17/01*** | (2006.01) |
| ***E02B 17/00*** | (2006.01) |
| ***F16L 55/04*** | (2006.01) |
| ***F16L 57/00*** | (2006.01) |
| ***F16L 58/00*** | (2006.01) |

(52) U.S. Cl.

CPC .......... *E21B 17/01* (2013.01); *E02B 17/0017* (2013.01); *F16L 55/041* (2013.01)

(58) Field of Classification Search

CPC .......... E21B 17/01; E21B 17/017; E21B 7/12; E21B 41/00; F16L 55/041; F16L 58/00; F16L 57/00; F15D 1/10; F16M 7/00; F16B 7/04

USPC .......................................................... 166/367

See application file for complete search history.

(56) References Cited

U.S. PATENT DOCUMENTS

| | | | | |
|---|---|---|---|---|
| 7,398,697 | B2 * | 7/2008 | Allen | E21B 47/01 73/800 |
| 9,080,392 | B1 * | 7/2015 | Allen | F16L 1/123 |
| 9,869,128 | B1 * | 1/2018 | Allen | E21B 17/01 |
| 10,473,131 | B1 * | 11/2019 | Allen | E21B 17/006 |
| 11,261,670 | B1 * | 3/2022 | Allen | E21B 17/01 |
| 2003/0074777 | A1 * | 4/2003 | McMillan | E21B 17/01 29/428 |
| 2006/0153642 | A1 * | 7/2006 | Esselbrugge | B63B 39/005 405/216 |
| 2008/0135232 | A1 * | 6/2008 | Lawler | E21B 17/006 166/173 |
| 2009/0185868 | A1 * | 7/2009 | Masters | F15D 1/10 405/211 |
| 2012/0291687 | A1 * | 11/2012 | Dehne | F16L 1/123 114/271 |
| 2013/0039702 | A1 * | 2/2013 | West | F15D 1/10 405/216 |
| 2019/0039703 | A1 * | 2/2019 | Kohnen | B63H 16/20 |
| 2019/0338482 | A1 * | 11/2019 | Lund | F16F 7/1034 |

* cited by examiner

*Primary Examiner* — Nicole Coy
*Assistant Examiner* — Douglas S Wood
(74) *Attorney, Agent, or Firm* — Maze IP Law, P.C.

(57) ABSTRACT

The disclosed invention comprises a vortex-induced-vibration (VIV) suppression system for tubulars, such as tubular structures (e.g., a riser), and uses a winding, e.g., ropes or cables, wound around tubular structures in a helical manner already deployed subsea. The helically wound ropes or cables tend to act as a VIV suppression device.

15 Claims, 2 Drawing Sheets

RETROFIT VORTEX-INDUCED VIBRATION (VIV) SUPPRESSION DEVICE

RELATION TO OTHER APPLICATIONS

This application claims priority through U.S. Provisional Application 63/526,595 filed on Jul. 13, 2023, incorporated herein by reference.

BACKGROUND

The disclosed invention relates to the field of suppressing vortex-induced vibration (VIV) in a subsea tubular.

Subsea tubular structures such as a pipeline, riser, spar, tendon, buoy, and similar structures installed on offshore structures can suffer from vibration induced by vortices created by ocean currents passing across the subsea tubular structure. This VIV can cause fatigue and other damage to the subsea tubular structure. It is possible to reduce or interrupt the vortices created by the current, and thereby the associated vibration, by placing helical protrusions on the riser. These protrusions (often called strakes) are normally installed during the installation process. Installing such equipment on an already-installed riser is expensive and difficult.

Generally, existing solutions for suppressing VIV in already deployed subsea tubular structures such as pipelines, risers, spars, tendons, buoys, and similar structures are very costly and time consuming. The installation of a VIV suppression device, e.g., helical strakes and fairings, involves the cost of these structures and installation costs for installing a VIV suppression device on a subsea tubular structure which significantly increases the overall cost of the project.

FIGURES

Various figures are included herein which illustrate aspects of embodiments of the disclosed inventions.

DESCRIPTION OF EXEMPLARY EMBODIMENTS

The disclosed invention comprises a vortex-induced vibration (VIV) suppression system for tubulars, such as tubular structures (e.g., a riser), and uses a winding, e.g., ropes and/or cables, wound in a helical manner around tubular structures already deployed subsea. The helically wound ropes or cables tend to act as a VIV suppression device.

Figure 1:
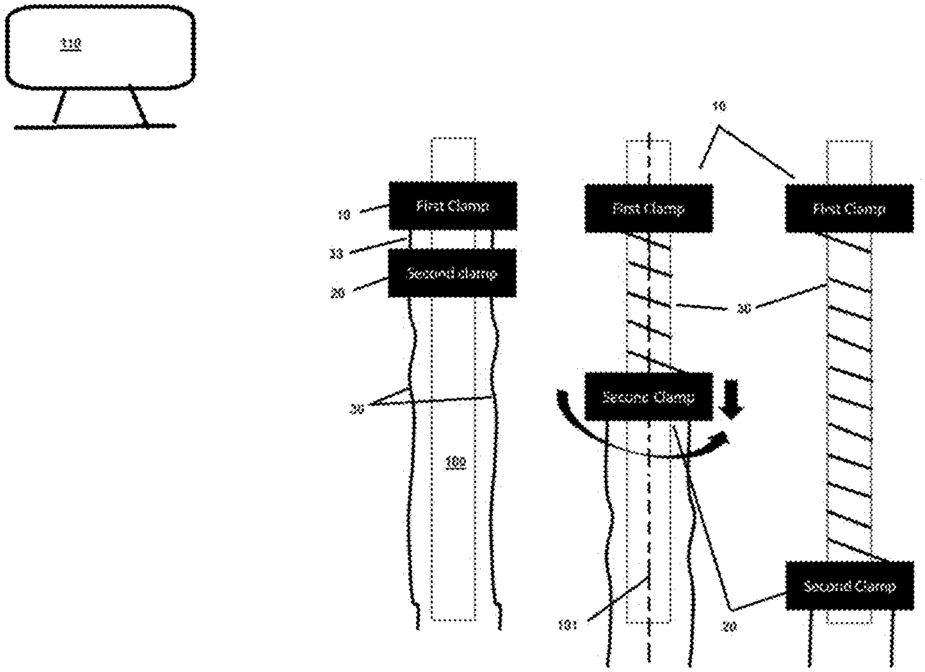
FIG. 1 is a block diagram of a first embodiment of the disclosed invention.

In a first embodiment, referring generally to FIG. 1, system 1 is useful for suppressing VIV and comprises first collar 10, second collar 20, and a predetermined set of windings 30, e.g., ropes and/or cables, to be arrayed and wound helically around or on tubular 100, which may have been previously deployed subsea and which may comprise a pipeline, riser, spar, tendon, or buoy, or the like. As used herein, a collar may comprise a clamp or similar structure which extends substantially about an outer circumferential surface of tubular 100.

First collar 10 is typically dimensioned to fit about, and configured to be able to be fixed or otherwise secured in a predetermined position on, tubular 100. First collar 10 may be connected to the predetermined set of windings 30 such as by threaded fasteners, welding, or other fasteners, or a combination thereof, and/or accept the predetermined set of windings 30 therethrough. In an embodiment, the predetermined set of windings 30 are typically affixed to first collar 10 using threaded fasteners.

Second collar 10 is also typically dimensioned to fit about, and configured to be able to be fixed or otherwise secured in a predetermined position on, tubular 100. In embodiments, second collar 10 is also dimensioned to rotatably fit about tubular 100.

In embodiments, first collar 10 and second collar 20 are adapted to be fixed or otherwise secured, e.g., attached or otherwise coupled, to tubular 100 via subsea vehicle 110 such a remotely operated vehicle (ROV), an autonomous underwater vehicle (AUV), or the like, or a human diver, or a combination thereof.

In a first embodiment, second collar 20 may be connected to the predetermined set of windings 30 by threaded fasteners, welding, or other fasteners, or a combination thereof, and/or accept the predetermined set of windings 30 therethrough, and is configured to be able to be axially rotatably mounted about tubular 100. In these embodiments, second collar 20 typically comprises mechanical mechanism 21 adapted to axially rotate second collar 20 about an outer surface of tubular 100 and, in certain embodiments, also move second collar 20 along longitudinal axis 101 of subsea tubular 100, e.g., away from first collar 10. In embodiments, mechanical mechanism 21 may comprise a hydraulic mechanism, a rack and pinion mechanism, a geared mechanism, an electromagnetic or magnetic mechanism, or the like, or a combination thereof.

The predetermined set of windings 30 is typically less expensive compared to other available VIV suppression devices. Further, the time consumed in deployment or installation of predetermined set of windings 30 is typically less when compared to existing VIV suppression devices.

Figure 2:
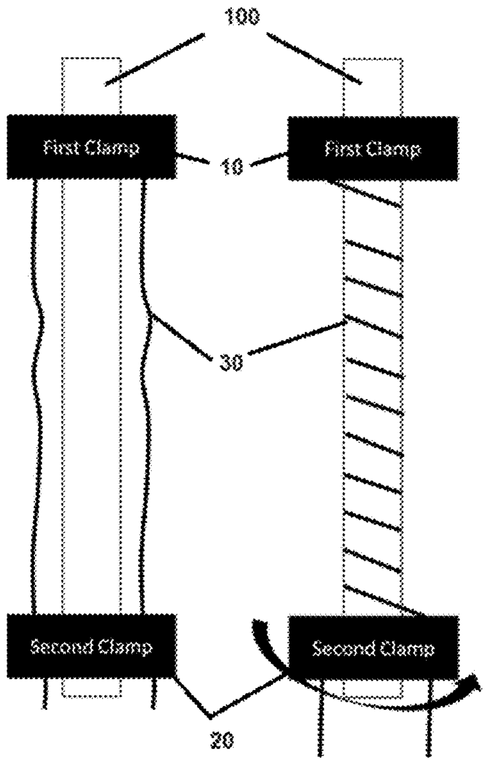
FIG. 2 is a block diagram of a second embodiment of the disclosed invention.

Referring additionally to FIG. 2, in certain other embodiments second collar 20 is fixed or otherwise secure at a predetermined location along axis 101 (FIG. 1) distally from first collar 10 and axially rotated about an outer surface of tubular 100, either by using mechanical mechanism 21 (FIG. 1), subsea vehicle 110 (FIG. 1), or the like, or a combination thereof, thus helically winding predetermined set of windings 30 along tubular 100. The predetermined set of windings 30 may be fixed or otherwise secured to second collar 20 prior to or after the winding.

Figure 3:
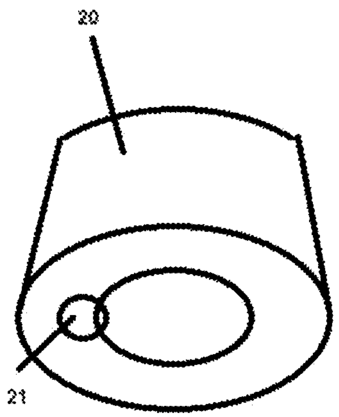
FIG. 3 is a block diagram of a second clamp with a mechanical mechanism.

In certain embodiments, referring to FIG. 3, rotator 40 may be present and adapted to be disposed about a circumference of tubular 100 and axially rotate the predetermined set of windings 30 about tubular 100, where the predetermined set of windings 30 form and define a helix. In these embodiments, first collar 10 and second collar 20 may be fixed or otherwise secured in place distally from each other and rotator 40, which may comprise a crawler, is adapted to be initially disposed intermediate first collar 10 and second collar 20 and typically configured to engage with the predetermined set of windings 30 in such a manner as to circumnavigate tubular 100 while traveling along axis 101 (FIG. 1), tensioning a first portion 30A of the predetermined set of windings 30 with respect to first collar 10 while maintaining contact with a second portion 30B of the predetermined set of windings 30 with respect to second collar 10. In embodiments, rotator 40 may comprise a hydraulic mechanism, a rack and pinion mechanism, a geared mechanism, an electromagnetic or magnetic mechanism, or the like, or a combination thereof, or, alternatively, comprise a mini-subsea vehicle or crawler or the like.

In the operation of exemplary methods, referring back to FIG. 1, in its embodiments system 1 suppresses VIV in subsea tubulars such as a pipeline, riser, spar, tendon, or buoy, and the like, by using a subsea vehicle 110. System 1 could be further used in surveying seabed, pipeline maintenance, leakage detection, pipeline inspection.

In embodiments, first collar 10, which is as described above, is typically rigidly fixed or otherwise secured to tubular 100 at a first initial position and second collar 20, which is as described above, is positioned along axis 101 of tubular 100 at an initial predetermined distance from first collar 10. In certain embodiments, second collar 20 is initially positioned proximate first collar 10. In other embodiments, e.g., as illustrated in FIG. 2, second collar 20 is initially positioned distally from first collar 10 and typically secured at that position while still being allowed to rotate in a predetermined direction, e.g., axially about an outer circumference of tubular 100 at that position.

First end 31 (FIG. 3) of the predetermined set of windings 30 is typically connected or secured to, or securely received into, first collar 10 and second end 32 (FIG. 3) of the predetermined set of windings 30 is connected or secured to, securely received into, or otherwise disposed through, second collar 20.

In certain embodiments, second collar 20 is capable of winding the predetermined set of windings 30 helically about an outer surface of tubular 100 without the aid of a separate mechanism, e.g., rotator 40. Rotation of second collar 20 about the outer surface of tubular 100, i.e., circumnavigation motion about axis 101 of tubular 100, allows the predetermined set of windings 30 to be wound about the outer surface of tubular 100 intermediate first collar 10 and second collar 20.

In certain embodiments, referring still to FIG. 1, second collar 20 moves longitudinally along axis 101 as well as rotating axially until it is stopped at a predetermined location along tubular 100, and the winding motion causes the predetermined set of windings 30 to be helically wound about the outer surface of tubular 100 intermediate first collar 10 and second collar 20 as second collar 20 traverses tubular 100. In these embodiments, axial rotation and longitudinal movement of second collar 20 may be provided either by mechanical mechanism 21, an external mover such as subsea vehicle 110, by a diver, or the like, or a combination thereof.

In various embodiments, second collar 20 can adjust a helix angle (winding angle) of the predetermined set of windings 30, as may be required, e.g., to achieve a desired winding angle by adjusting a rate of linear movement along axis 101. In addition, if the predetermined set of windings 30 comprises a plurality of ropes or cables, second collar 20 may adjust a distance between two or more strands of the predetermined set of windings 30, as may be required. Moreover, in embodiments where second collar 20 travels linearly away from first collar 10, second collar 20 may further wind the predetermined set of windings 30 along an adjustable length of tubular 100.

Referring additionally to FIG. 2, first collar 10 may be placed at a predetermined position about an outer surface of tubular 100 and fixed in place or otherwise secured at first collar initial position, and second collar 20 disposed apart from first collar 10 along axis 101 but fixed in place or otherwise secured at a second collar initial position distally at a specific distance relative to first collar 19. In this embodiment, second collar 20 is capable of rotating axially about axis 101 but in this embodiment there is no linear movement of second collar along axis 101. Axial movement of second collar 20 winds the predetermined set of windings 30 helically about the outer surface of tubular 100 between first collar 10 and second collar 20. As described above, the linear and axial movement may be accomplished using mechanical mechanism 21, subsea vehicle 110, a diver, or the like, or a combination thereof.

In various embodiments, the predetermined set of windings is connected or otherwise secured to first collar 10 and secured to or fed or positioned through second collar 20, such as while second collar 20 is traveling and/or rotating, and, with the continued rotation of second collar 20, the predetermined set of windings 30 will be wound helically about the outer surface of tubular 100 to achieve a predetermined desired tension.

Figure 4:
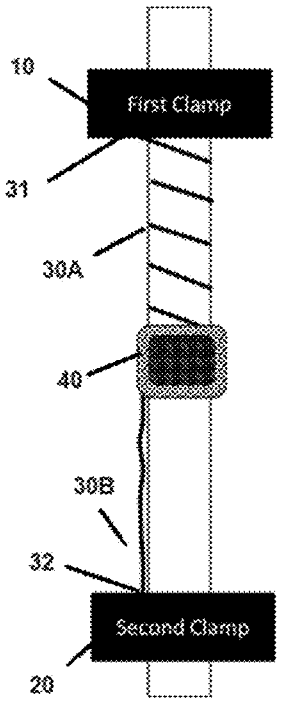
FIG. 4 is a block diagram of a third embodiment of the disclosed invention.

In a further embodiment, referring to FIG. 4, rotator 40, which is as described above, is provided between first collar 10 and second collar 20. In this embodiment, both clamps 10, 20 are rigidly fixed or otherwise secured to tubular 100 at a predetermined displacement distance relative to each other. Rotator 40, which is capable of linear and axial movement along axis 101 (FIG. 1), accepts the predetermined set of windings 30, e.g., grips the predetermined set of windings 30, and, via axial rotation, thereby winds the predetermined set of windings 30 helically about the outer surface of tubular 100, typically as it moves linearly along axis 101 until it reaches a desired position along axis 101. Rotator 40 is typically capable of linear travel along axis 101 while rotating axially.

In these embodiments, the predetermined set of windings 30 is typically connected or otherwise secured to first collar 10 at first end 31 and, after helically winding the predetermined set of windings 30, rotator 40 may then connect or otherwise secure second end 32 of the predetermined set of windings 30 to second collar 20.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A vortex-induced vibration (VIV) suppression system, comprising:

a. a first collar, dimensioned to fit about and be secured to an outer circumference of a tubular;

b. a second collar, dimensioned to rotatably fit about and be secured to the outer circumference of the tubular at a predetermined secured position disposed away from the first collar; and c. a predetermined set of windings adapted to be arrayed helically around the tubular intermediate the first collar and the second collar, the first collar or the second collar further adapted to helically array the predetermined set of windings about the tubular by rotation of the first collar or the second collar about the outer circumference of the tubular, the predetermined set of windings operatively secured to either the first collar or the second collar prior to being helically arrayed by rotation of either the first collar or the second collar.

2. The vortex-induced vibration (VIV) suppression system of claim 1, wherein the second collar is further configured to traverse along the tubular from an initial position to the predetermined secured position disposed away from the first collar.

3. The vortex-induced vibration (VIV) suppression system of claim 1, wherein the first collar is adapted to be secured to the tubular using a remotely operated vehicle (ROV) subsea.

4. The vortex-induced vibration (VIV) suppression system of claim 1, wherein the second collar is adapted to be positioned about the tubular using a remotely operated vehicle (ROV) subsea.

5. The vortex-induced vibration (VIV) suppression system of claim 1, wherein predetermined set of windings comprises a plurality of cables, a plurality of ropes, or a combination thereof.

6. The vortex-induced vibration (VIV) suppression system of claim 1, wherein the second collar comprises a mechanical mechanism configured to rotate the second collar about the tubular, move the second collar about an outer surface of the tubular along a longitudinal axis of the tubular, or a combination thereof.

7. The vortex-induced vibration (VIV) suppression system of claim 1, wherein the tubular comprises a tubular structure previously deployed subsea.

8. The vortex-induced vibration (VIV) suppression system of claim 1, wherein the tubular comprises a pipeline, riser, spar, tendon, or buoy.

9. A method of deploying a vortex-induced vibration (VIV) suppression 1 system (1) about a tubular, the vortex-induced vibration (VIV) suppression system (1) comprising a first collar, dimensioned to fit about and be secured to an outer circumference of a tubular, a second collar which is dimensioned to rotatably fit about and be secured to the outer circumference of the tubular at a predetermined secured position disposed away from the first collar, and a predetermined set of windings adapted to be arrayed helically around the tubular intermediate the first collar and the second collar where the predetermined set of windings are operatively secured to either the first collar or the second collar, the method comprising:

a. securing the first collar about an outer surface of a tubular at a first predetermined initial position;
b. positioning the second collar about the outer surface of the tubular at a second predetermined initial position distally from the first collar with respect to a longitudinal axis of the tubular;
c. attaching a first end of the predetermined set of windings to the first collar;
d. securing a first portion of predetermined set of windings to the second collar; and
e. rotating the second collar in a predetermined circumferential direction to wind predetermined set of windings into a helix about the tubular.

10. The method of claim 9, further comprising moving the second collar from its initial position linearly with respect to a longitudinal axis of the tubular away from the first collar to a desired position along the tubular while rotating the second collar in a predetermined circumferential direction to wind predetermined set of windings into a helix about the tubular.

11. The method of claim 10, further comprising:

a. allowing a predetermined portion of predetermined set of windings the be fed through the second collar while moving the second collar; and
b. at the desired position along the tubular,
   i. stopping further travel by the second collar;
   ii. securing the predetermined set of windings to the second collar; and
   iii. securing the second collar to the outer surface of the tubular.

12. The method of claim 10, further comprising continuing to rotate the second collar about the tubular at the desired position until a desired tension of the predetermined set of windings about the outer surface of the tubular is achieved.

13. The method of claim 10, further comprising continuing to rotate the second collar about the tubular at the desired position until a desired winding angle of the predetermined set of windings about the outer surface of the tubular is achieved.

14. The method of claim 10, further comprising securing the predetermined set of windings to the second collar prior to moving the second collar along the tubular.

15. A vortex-induced vibration (VIV) suppression system, comprising:

a. a first collar, dimensioned to fit about and be secured to an outer circumference of a tubular;
b. a second collar, dimensioned to rotatably fit about and be secured to the outer circumference of the tubular at a predetermined secured position disposed away from the first collar;
c. a predetermined set of windings adapted to be arrayed helically around the tubular intermediate the first collar and the second collar, the predetermined set of windings operatively secured to either the first collar or the second collar; and
d. a rotator adapted to be disposed about the outer circumference of the tubular, the rotator configured to engage with the predetermined set of windings in such a manner as to circumnavigate the tubular while traveling along an axis of the tubular, thereby tensioning a first portion of the predetermined set of windings with respect to the first collar while maintaining contact with a second portion of the predetermined set of windings with respect to the second collar, thereby axially helically rotating the predetermined set of windings about the tubular.

* * * * *